(12) United States Patent
Chen et al.

(10) Patent No.: US 11,531,290 B2
(45) Date of Patent: Dec. 20, 2022

(54) PRESSURIZATION DEVICE FOR TONER CARTRIDGE AND TONER CARTRIDGE

(71) Applicant: TANGSHAN CAOFEIDIAN IMAGING TECHNOLOGY LTD. CO., Hebei (CN)

(72) Inventors: Bo Chen, Hebei (CN); Hongbin Wang, Hebei (CN)

(73) Assignee: TANGSHAN CAOFEIDIAN IMAGING TECHNOLOGY LTD. CO., Hebei (CN)

(*) Notice: Subject to any disclaimer, the term of this patent is extended or adjusted under 35 U.S.C. 154(b) by 0 days.

(21) Appl. No.: 17/270,047

(22) PCT Filed: Jan. 31, 2019

(86) PCT No.: PCT/CN2019/074120
§ 371 (c)(1),
(2) Date: Feb. 22, 2021

(87) PCT Pub. No.: WO2020/015352
PCT Pub. Date: Jan. 23, 2020

(65) Prior Publication Data
US 2021/0325801 A1    Oct. 21, 2021

(30) Foreign Application Priority Data
Jul. 17, 2018 (CN) .......................... 201810782270.0

(51) Int. Cl.
*G03G 15/08* (2006.01)
*G03G 21/20* (2006.01)

(52) U.S. Cl.
CPC ..... *G03G 15/0896* (2013.01); *G03G 15/0867* (2013.01); *G03G 21/206* (2013.01);
(Continued)

(58) Field of Classification Search
CPC ........... G03G 15/0896; G03G 15/0867; G03G 21/206; G03G 15/0889; G03G 2215/085;
(Continued)

(56) References Cited

U.S. PATENT DOCUMENTS 5,950,055 A * 9/1999 Yahata ............... G03G 15/0822
399/252
9,354,551 B2 * 5/2016 Murakami ......... G03G 15/0872
(Continued)

FOREIGN PATENT DOCUMENTS

CN       108957987 A  * 12/2018
JP       2010256893 A * 11/2010 ............. G03G 15/08
(Continued)

*Primary Examiner* — Walter L Lindsay, Jr.
*Assistant Examiner* — Laura Roth

(57) ABSTRACT

A pressurization device for a toner cartridge includes an inner cover, an airbag and a sliding member. The inner cover is arranged at a toner feeding port of the toner cartridge; the airbag is made of elastic material; the airbag includes a fixed end that is fixed to the inner cover and a free end that extends outward from the fixed end; the fixed end is provided with an airbag opening interconnected to an interior of the toner cartridge; a remaining portion of the airbag is arranged as closed except for the airbag opening; a first end of the sliding member is connected to the free end of the airbag and moves toward the fixed end of the airbag back and forth, so that the airbag ejects gas into the toner cartridge by means of being compressed.

16 Claims, 9 Drawing Sheets

(52) U.S. Cl.
CPC ....... *G03G 15/087* (2013.01); *G03G 15/0879* (2013.01); *G03G 2215/0663* (2013.01); *G03G 2215/0668* (2013.01); *G03G 2215/0675* (2013.01)

(58) Field of Classification Search
CPC ............. G03G 15/087; G03G 15/0879; G03G 2215/0663; G03G 2215/0668; G03G 2215/0675
See application file for complete search history.

(56) References Cited

U.S. PATENT DOCUMENTS

| | | | | |
|---|---|---|---|---|
| 9,665,064 | B1* | 5/2017 | Kim | G03G 21/1676 |
| 2005/0201780 | A1* | 9/2005 | Fujii | G03G 15/0879 |
| | | | | 399/258 |
| 2008/0213003 | A1* | 9/2008 | Sano | G03G 15/0879 |
| | | | | 399/258 |
| 2012/0014713 | A1* | 1/2012 | Murakami | G03G 15/0877 |
| | | | | 399/119 |

FOREIGN PATENT DOCUMENTS

| | | | | | |
|---|---|---|---|---|---|
| JP | 2013047714 | A | * | 3/2013 | ......... G03G 15/0865 |
| WO | WO-2010114154 | A1 | * | 10/2010 | ............. G03G 15/08 |
| WO | WO-2012043875 | A1 | * | 4/2012 | ............. G03G 15/08 |
| WO | WO-2012043876 | A1 | * | 4/2012 | ............. G03G 15/08 |
| WO | WO-2012169657 | A1 | * | 12/2012 | ........... B24B 31/108 |

* cited by examiner

PRESSURIZATION DEVICE FOR TONER CARTRIDGE AND TONER CARTRIDGE

BACKGROUND OF THE PRESENT INVENTION

Field of Invention

The present invention relates to a technical field of toner cartridge, and more particularly to a pressurization device for a toner cartridge and a toner cartridge.

Description of Related Arts

In the printing devices such as printer and duplicator, the cylindrical bottle is commonly used; generally, a toner addition port and a toner outlet are respectively arranged at two ends of the bottle; through the toner addition port, toner is fed into the bottle; through rotating the bottle, the toner is transported to the toner outlet and supplied.

The Chinese patent application, CN 201310397964.X, disclosed a helical toner cartridge for the duplicator, comprising a toner cartridge main body, a toner cartridge upper cover, a toner output device, a positioning ring and a stirring blade; a toner addition port is provided at a bottom of the toner cartridge main body; after the toner is fed into the toner cartridge main body, toner transportation is realized through the stirring blade; and the thread on the toner cartridge main body improves mixing and flowing of the toner. In this technical solution, before the toner cartridge main body reaches a service life, the toner can be added repeatedly through the toner addition port.

However, during usage, because the toner cartridge may be idle for a long time, the toner in the toner cartridge, the toner in the passage of the toner output device at the toner outlet, and the toner in other flowing passages of the printing device from the toner outlet will be adsorbed mutually and clumped, and then compacted into the toner block; because the transportation power of the toner mainly depends on the stirring blade and the rotation of the toner cartridge, it is difficult to completely and smoothly eject the toner out of the toner output device, and the transportation speed of the toner is slow, finally resulting in blockage due to accumulation of the toner.

The Chinese patent applications, CN 201810115704.1 and CN 201710384730.X, both disclosed a toner cartridge with a toner output device. Inside the toner output device, through cooperation of multiple precise parts, toner supply is realized. If the toner cartridge is idle for a long time, the residual toner inside the toner output device is easily clumped, and a blockage will occur due to accumulation.

The Chinese patent application, CN 201621358672.0, disclosed a toner leakage-preventing pressure buffering cover for a toner cartridge, comprising a cover body matching with the toner feeding port of the toner cartridge, wherein: a pressure regulating hole is provided on the cover body, penetrating through both of the inner and outer sides; and a pressure regulating elastomer for sealing the pressure regulating hole is arranged at the outer side of the cover body. Although the pressure regulating elastomer can be elastically deformed, it is designed for preventing the toner cartridge from being damaged by the pressure impact when falling, having the different inventive concept from the present invention.

SUMMARY OF THE PRESENT INVENTION

An object of the present invention is to provide a pressurization device for a toner cartridge, so as to solve a problem that fluidity of toner is insufficient when being transported in conventional toner cartridges.

In order to accomplish the above object, the present invention provides a pressurization device for a toner cartridge, comprising:

an inner cover, which is arranged at a toner feeding port of the toner cartridge;

an airbag, which is made of elastic material, wherein: the airbag comprises a fixed end that is fixed to the inner cover and a free end that extends outward from the fixed end; the fixed end is provided with an airbag opening interconnected to an interior of the toner cartridge; and a remaining portion of the airbag is arranged as closed except for the airbag opening; and a sliding member with a first end connected to the free end of the airbag, wherein: the first end of the sliding member is able to move toward the fixed end of the airbag back and forth, so that the airbag ejects gas into the toner cartridge by means of being compressed.

Preferably, the pressurization device further comprises:

an outer cover, wherein: an elliptical annular groove facing the toner cartridge is formed on the outer cover; a center line of the elliptical annular groove and an axis of the toner cartridge are collinear;

wherein: a slide portion is arranged at a side of the inner cover, closing to the elliptical annular groove; a sliding slot, which penetrates through the slide portion in an axial direction and extends along a radial direction, is provided on the slide portion;

a middle part of the sliding member is able to slide in the sliding slot; a second end of the sliding member is slidably embedded in the elliptical annular groove;

when the slide portion rotates with the toner cartridge relative to the outer cover, the sliding member slides back and forth in the sliding slot, so that the airbag is continuously compressed and ejects gas into the toner cartridge.

Preferably, the inner cover comprises:

a cap portion, which is arranged on the toner cartridge; and a channel portion, which protrudes from a side, away from the toner cartridge, of the cap portion, wherein: the channel portion has a first air vent formed at a joint with the cap portion, and a second air vent facing outward; the fixed end of the airbag is fixed on the channel portion, the airbag opening corresponds to the second air vent, and the second air vent is sealed by the airbag.

Preferably, the cap portion is connected with the toner cartridge in threaded connection; a reversion-preventing bump is arranged at a tail end of a thread on the toner cartridge, and a reversion-preventing opening is provided on the cap portion; when the cap portion is completely connected with the toner cartridge, the reversion-preventing to opening exactly matches with the reversion-preventing bump.

Preferably, a tubular connection part is formed on the channel portion and extends outward along a radial direction of the toner cartridge; an opening of the connection part is the second air vent; the airbag is bell-shaped, and a bottom opening of the airbag is the airbag opening; the airbag tightly clamps the connection part.

Preferably, an outer circumferential surface of the connection part is inward concave to form an annular second clamping groove; a bottom edge of an inner circumferential surface of the airbag protrudes inward to form an annular protruding part; the protruding part tightly fits the second clamping groove.

Preferably, the slide portion is flat and extends from a rearmost end of the channel portion along the radial direction of the toner cartridge, so that an airbag accommodation space for the airbag is formed between the slide portion and the cap portion.

Preferably, the outer cover is cylindrical; a plurality of clamping pieces are arranged at a first end of the outer cover, closing to the toner cartridge; an outer circumferential surface of the inner cover is inward concave to form an annular first clamping groove; when the inner cover except the cap portion is arranged inside the outer cover, the clamping pieces rotationally fits the first clamping groove.

Preferably, an outer cover end face is formed at a second end of the outer cover, away from the toner cartridge; an end face opening is provided on the outer cover end face; an outer cover cap is arranged at the end face opening; the outer cover cap is integrated with the outer cover end face through ultrasonic welding; a protruding inner annular part is formed on the outer cover cap; an outer annular part, opposite to the inner annular part, is formed at an edge of the end face opening; the inner annular part and the outer annular part are both elliptical; and the elliptical annular groove is formed between the inner annular part and the outer annular part.

Preferably, a first limiting convex edge, which protrudes inward, is arranged on the outer annular part; a second limiting convex edge, which protrude outward, is arranged on the inner annular part; the first limiting convex edge corresponds to the second limiting convex edge, for axially positioning the second end of the sliding member.

Preferably, a threaded hole is provided at the second end of the sliding member; a screw is mounted in the threaded hole; a square platform is arranged at a side of the sliding member, where the second end is located; the square platform matches with inner sides of the sliding slot; a circular platform is between a head and a threaded portion of the screw; the circular platform is limited between the first limiting convex edge and the second limiting convex edge.

Preferably, a screw mounting hole is provided at a bottom of the elliptical annular groove.

Preferably, an outer cover opening is provided on an outer circumferential surface of the outer cover and is close to the screw mounting hole.

Preferably, the sliding member comprises an annular portion and a rod portion; a cylindrical airbag bump is arranged at the free end of the airbag; the annular portion tightly clamps the airbag bump; and the rod portion is connected to a radial side of the annular portion.

Preferably, the free end of the airbag has a plane; the plane is parallel with the axis of the toner cartridge and bonds to the annular portion.

Preferably, fixing ribs, which extend along an axial direction of the outer cover, are arranged on the outer circumferential surface of the outer cover, fox fixing the outer cover.

Preferably, a sealing ring is arranged between the inner cover and the toner cartridge.

The present invention further provides a toner cartridge, comprising the above pressurization device.

Compared with the prior art, the technical solutions of the present invention have beneficial effects as follows.

First, due to the insufficient fluidity of the toner, the toner is easily accumulated and clumped in the toner passage of the printing device when ejected into the toner passage, especially when ejected by the toner output device of the conventional toner cartridge. Aiming at the above problem, according to the present invention, the elastic airbag is arranged at the end of the toner cartridge, where the toner feeding port is located; through continuously compressing the airbag, high-pressure gas is ejected into the toner cartridge, so that the toner surrounding the toner outlet of the toner cartridge will be blown out under the effect of the high-pressure gas and enters the toner passage of the printing device; therefore, fluidity of the toner ejected into the printing device is improved, fluidity of the toner inside each toner flowing passage of the printing device is improved, problems such as easy compaction and clumping of the toner inside the flowing passage of the printing device are solved, and a blockage of the toner at the toner outlet of the toner cartridge and inside the toner passage of the printing device is effectively prevented.

Second, according to the pressurization device provided by the present invention, the airbag is compressed through the sliding member; the sliding member regularly slides back and forth in the straight sliding slot and the elliptical annular groove at the same time; the present invention has a simple and compact structure and a reliable motion.

Third, according to the present invention, the power of the movement of the sliding member along the elliptical annular groove is supplied by the own rotation of the toner cartridge. When the toner cartridge rotates by every half turn relative to the outer cover, the sliding member is driven to slide back and forth once in the sliding slot; therefore, when the toner cartridge transports the toner with the own helical groove, while the toner cartridge rotates by one turn, the airbag ejects the high-pressure gas into the toner cartridge twice, and the toner at the toner outlet is blown out twice. Mixing gas with toner can increase the toner output amount, thereby effectively improving the transportation speed and transportation efficiency of the toner.

BRIEF DESCRIPTION OF THE DRAWINGS

To illustrate the technical solutions in the embodiments of the present invention or the prior art more clearly, the accompanying drawings for describing the embodiments or the prior art are simply described. Apparently, the accompanying drawings in the following description are only some embodiments of the present invention, and persons of ordinary skill in the art can derive other drawings from the accompanying drawings without creative efforts.

Figure 1:
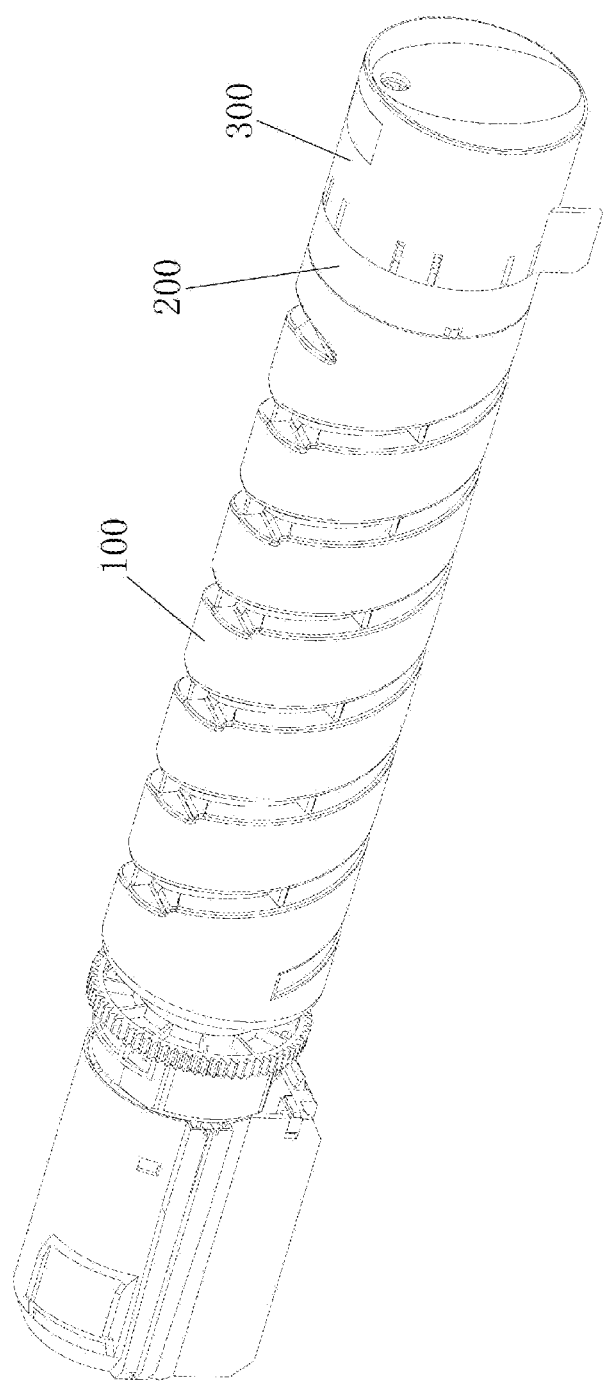
FIG. 1 is a structural sketch view of a pressurization device arranged on a toner cartridge according to a preferred embodiment of the present invention.

In figures: 100: toner cartridge; 110: toner feeding port; 120: reversion-preventing bump; 200: inner cover; 210: cap portion; 211: cap bottom; 212: first clamping groove; 213: reversion-preventing opening; 220: channel portion; 221: first air vent; 222: second air vent; 223: first plane; 224: connection part; 225: second clamping groove; 230: slide portion; 231: sliding slot; 240: airbag accommodation space; 250: sealing ring; 300: outer cover; 310: fixing rib; 320: clamping piece; 330: outer cover end face; 540: fitting member; 331: end face opening; 332: outer annular part; 333: first limiting convex edge; 340: outer cover cap; 341: inner annular part; 342: second limiting convex edge; 343: screw mounting hole; 350: outer cover opening; 360: sealing cap; 400: airbag; 410: airbag opening; 420: airbag bump; 430: protruding part; 440: second plane; 500: sliding member; 510: annular portion; 520: rod portion; 521: threaded hole; 522: square platform; 530: screw; and 531: circular platform.

DETAILED DESCRIPTION OF THE PREFERRED EMBODIMENT

The technical solutions in the embodiments of the present invention are clearly and completely described with the accompanying drawings as follows. Apparently, the described embodiments are only a part of embodiments of the present invention, not all of the embodiments. Based on the embodiments of the present invention, other embodiments obtained by one of ordinary skill in the art without creative efforts are all encompassed in the protection scope of the present invention.

It should be noted that: all directional indications in the embodiments of the present invention (such as "up", "down", "left", "right", "front" and "back") are only for describing a relative position relationship or motion situation among the parts under a specified attitude (as shown in figures); if the specified attitude changes, the directional indication also correspondingly changes.

In addition, the terms such as "first" and "second" in the present invention are only for description, not for indicating or implying a relative importance or an amount of the technical features. Thus, the feature limited by the term such as "first" and "second" indicates or implies that it comprises at least one feature. In the description of the present invention, "multiple" represents at least two, unless specifically limited.

In the present invention, unless specifically limited, the terms such as "connect" and "fix" should be broadly understood. For example, "connection" can be fixed connection, detachable connection or integrated connection; "connection" can be mechanical connection or electric connection; "connection" can be direct connection, indirect connection through the medium, interconnection between the two elements, or the interactive relationship between the two elements, unless specifically limited. One of ordinary skill in the art can understand the concrete meanings of the above terms in the present invention according to the specific situation.

Moreover, the technical solutions in each embodiment of the present invention can be combined based on a premise of enablement by one of ordinary skill in the art; when the combination of the technical solutions has contradiction or is unable to be realized, it should be considered that the combination is inexistent and not encompassed in the protection scope of the present invention.

According to the preferred embodiment of the present invention, a pressurization device for a toner cartridge is provided.

Figure 2:
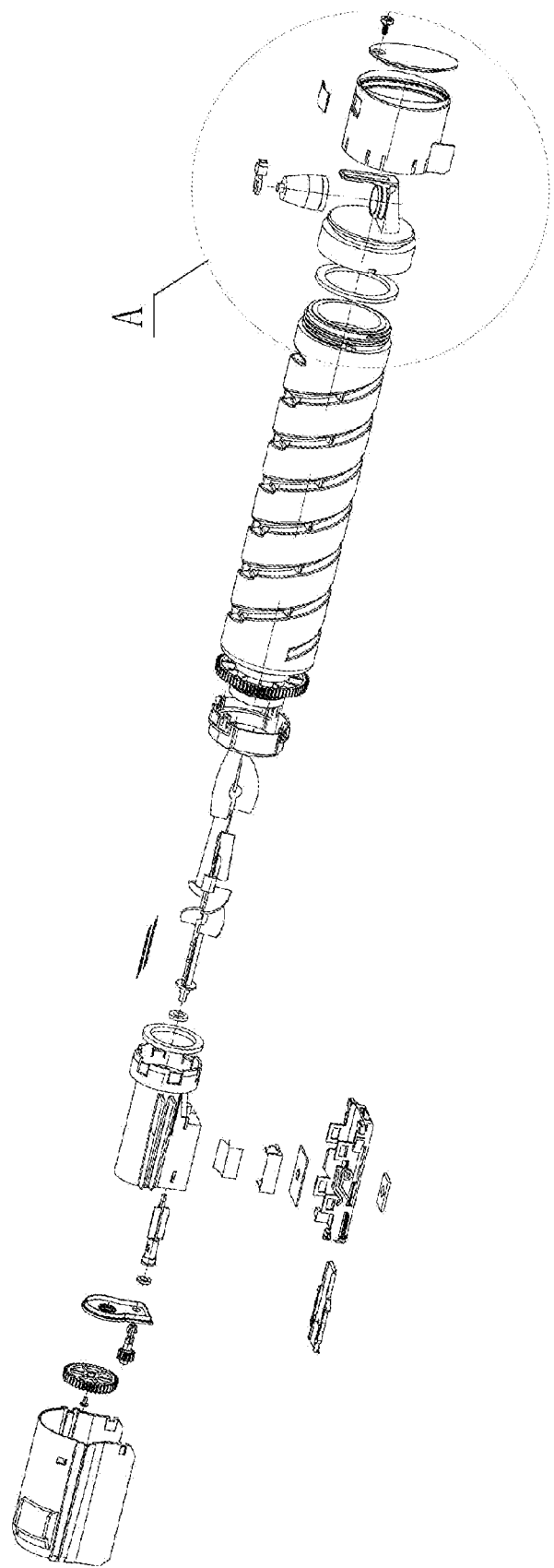
FIG. 2 is an exploded view of FIG. 1.
Figure 3:
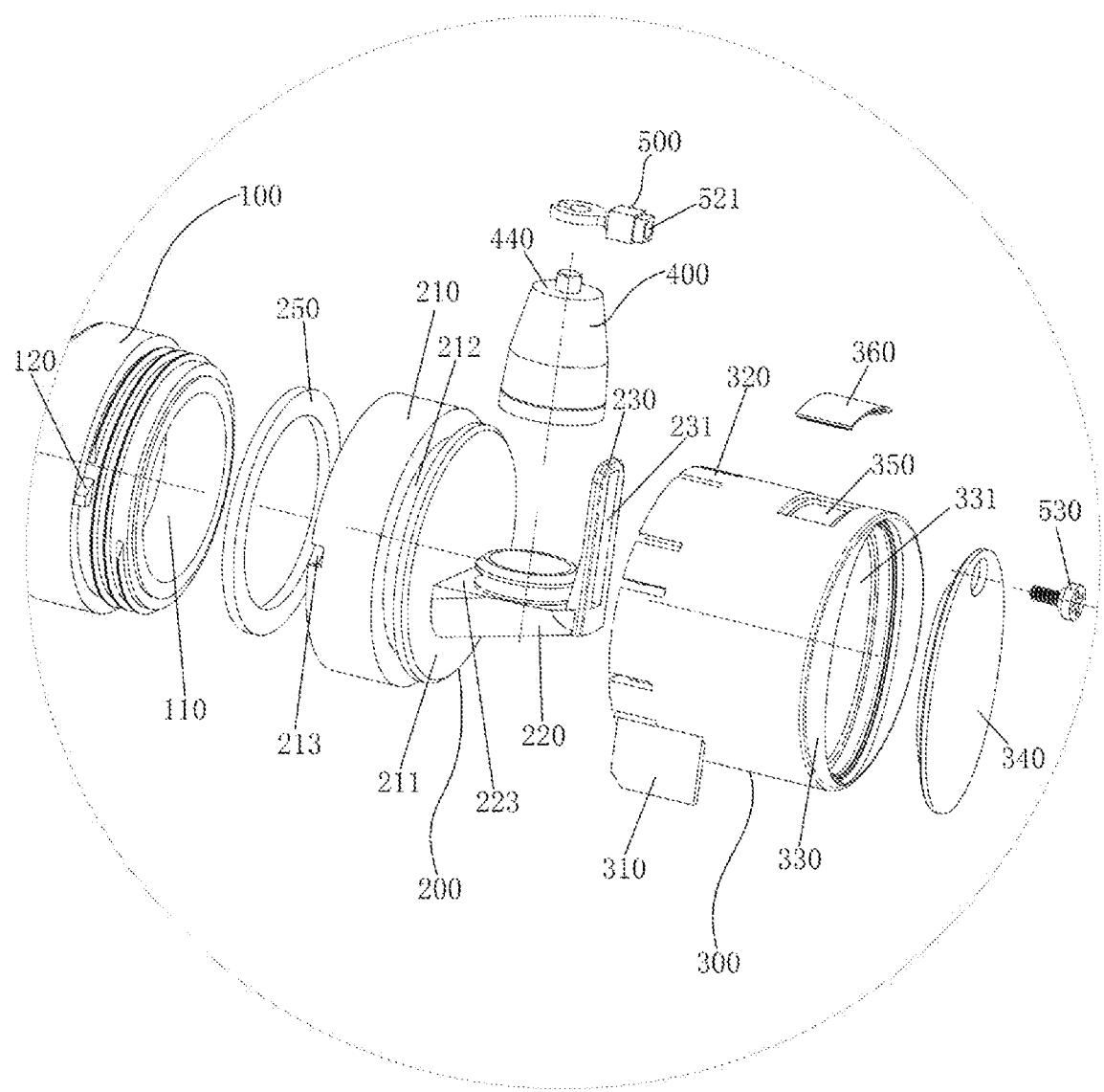
FIG. 3 is an enlarged view of a portion A in FIG. 2.
Figure 4:
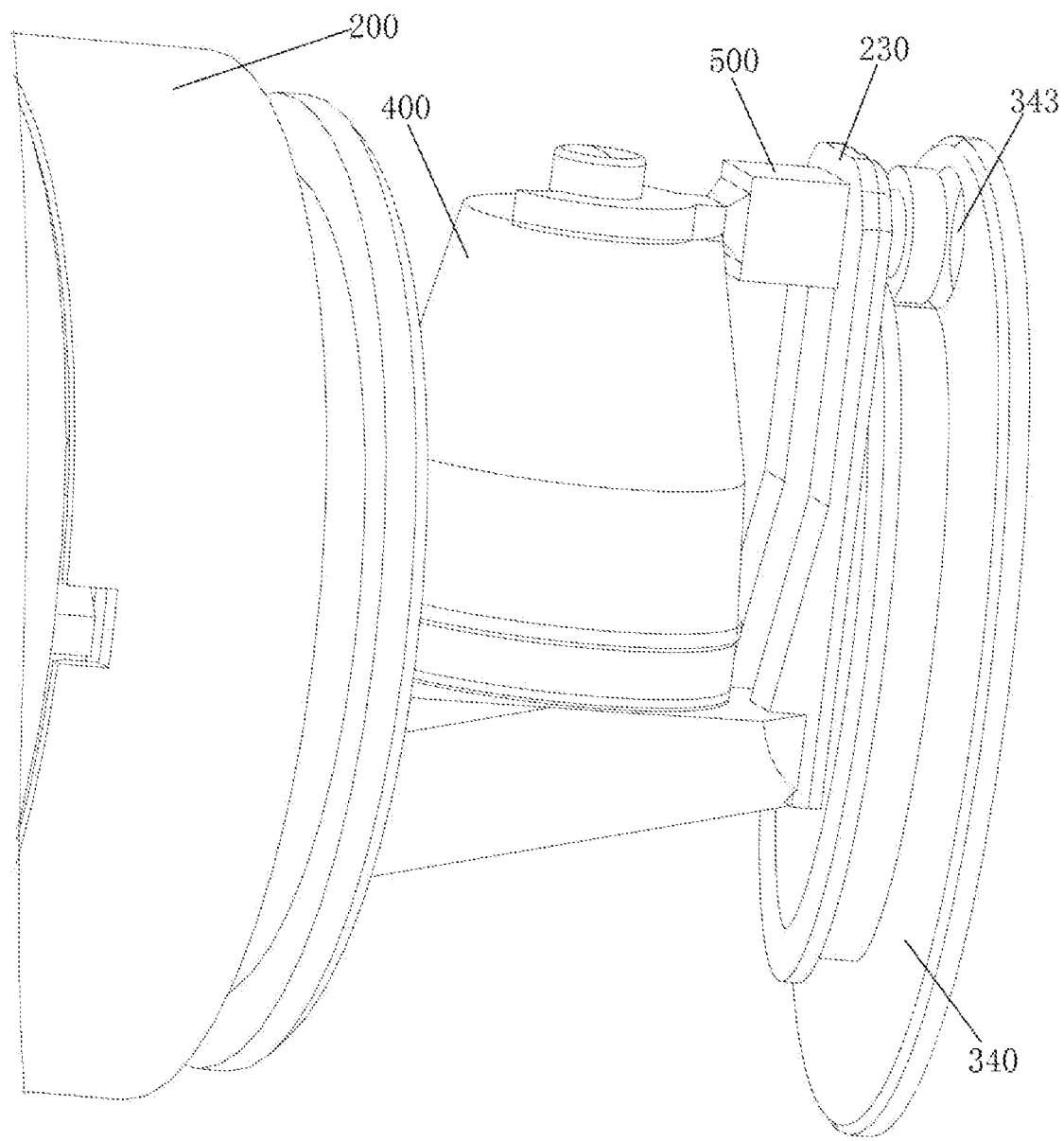
FIG. 4 is a structural sketch view of the pressurization device in FIG. 1 without an outer cover.

FIG. 1 is a structural sketch view of the pressurization device arranged on the toner cartridge according to the preferred embodiment of the present invention. FIG. 2 is an exploded view of FIG. 1. FIG. 3 is an enlarged view of the pressurization device in FIG. 2. FIG. 4 is a structural sketch view of an internal assembly of FIG. 3 without an outer cover. The pressurization device provided by the present invention matches with a toner cartridge 100 of a printing device, and the toner cartridge 100 contains toner and is cylindrical; a toner feeding port 110 is provided at one end of the toner cartridge 100 along an axial direction. Conventionally, the toner feeding port 110 is sealed by a common outer cover. A toner output device is arranged at the other end of the toner cartridge 100, for ejecting toner inside the toner cartridge 100, so that the toner can be used for printing; a main gear is arranged on the toner cartridge 100, and the printing device drives the toner cartridge 100 to rotate through the main gear.

According to the preferred embodiment of the present invention, the pressurization device for the toner cartridge comprises an inner cover 200, an outer cover 300, an airbag 400 and a sliding member 500. For description, one end of the toner cartridge 100, where the toner output device is located, is defined as a front end, and the other end of the toner cartridge 100, where the toner feeding port is located, is defined as a back end.

Figure 7:
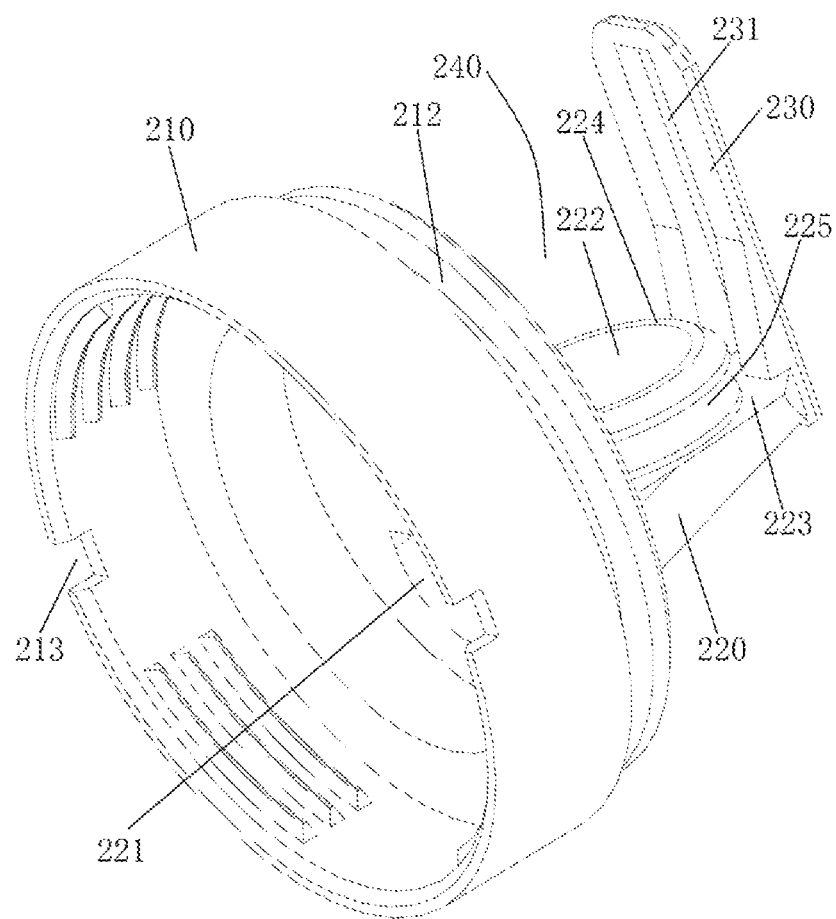
FIG. 7 is a structural sketch view of an inner cover of the pressurization device in FIG. 1.

Referring to FIG. 7, the inner cover 200 comprises a cap portion 210, a channel portion 220 and a slide portion 230.

The cap portion 210 is a circular cap, and an inner circumferential surface of the cap portion 210 is threaded; the cap portion 210 is fixedly arranged on the toner cartridge 100 through threaded connection; a reversion-preventing bump 120 is arranged at a tail end of a thread on the toner cartridge 100, and a reversion-preventing opening 213 is provided on the cap portion 210; when the cap portion 210 is completely connected with the toner cartridge 100, the reversion-preventing opening 213 exactly matches with the reversion-preventing bump 120, so that the cap portion 210 cannot reversely rotate, playing a role of preventing reversion; therefore, the inner cover 200 is always fixed on the toner cartridge 100 when the toner cartridge 100 rotates. A back end of the cap portion 210 is a cap bottom 211; an outer circumferential surface of the cap portion 210 is inward concave to form an annular first clamping groove 212, and the first clamping groove 212 is close to the cap bottom 211; the first clamping groove 212 matches with clamping pieces 320 of the outer cover 300, so that the inner cover 200 and the outer cover 300 are axially fixed.

The channel portion 220 is arranged on the cap portion 210 and protrudes backward from the cap bottom 211; an airflow channel is formed inside the channel portion 220; the channel portion 220 has a first air vent 221 formed at a joint with the cap bottom 211, and also has a second air vent 222 facing outward in a radial direction of the toner cartridge; the second air vent 222, the airflow channel and the first air vent 221 are sequentially interconnected; the second air vent 222 is interconnected to an internal of the airbag 400, for ejecting gas compressed by the airbag 400 into the toner cartridge 100 through the first air vent 221.

The slide portion 230 is flat and extends outward from a rearmost end of the channel portion 220 along the radial direction of toner cartridge, so that an airbag accommodation space 240 for the airbag 400 is formed between the slide portion 230 and the cap portion 210; a sliding slot 231 is provided on the slide portion 230; the sliding slot 231 penetrates through the slide portion 230 in the axial direction of the toner cartridge and extends along the radial direction of the outer cover 300, so that the sliding member 500 is inserted into the sliding slot 231 and slides back and forth along the radial direction of the toner cartridge.

Figure 6:
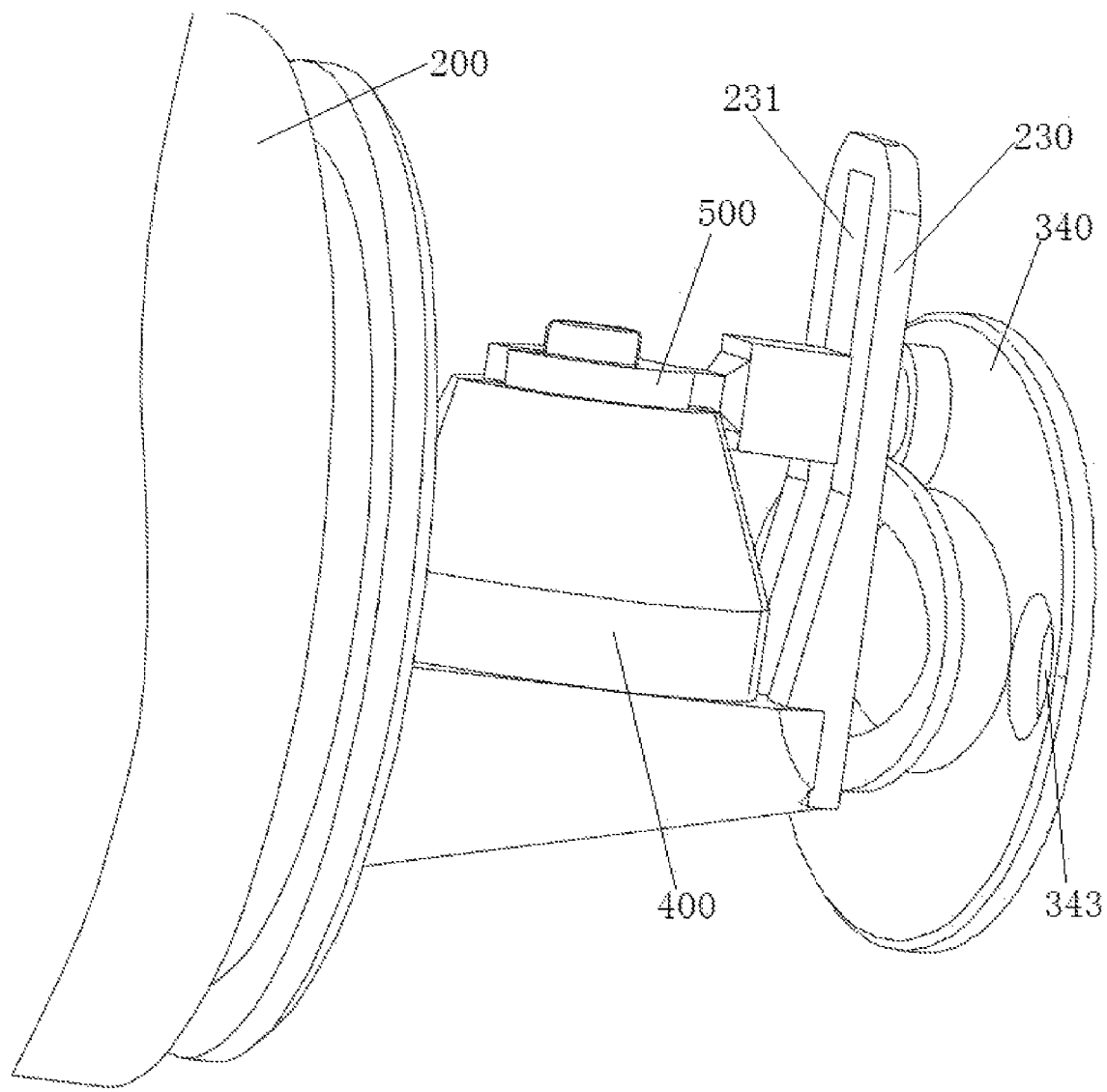
FIG. 6 is a structural sketch view of the pressurization device in FIG. 1, when an airbag is compressed to a lowest position.
Figure 8:
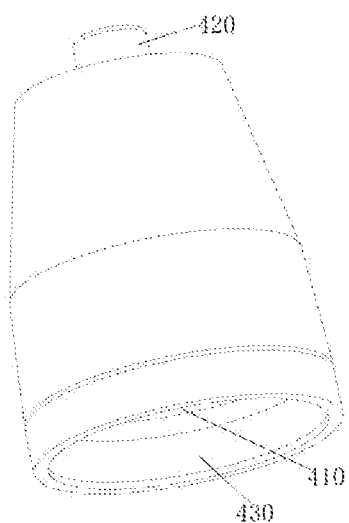
FIG. 8 is a structural sketch view of the airbag of the pressurization device in FIG. 1.

Referring to FIG. 8, the airbag 400 is made of elastic material, such as silica gel and soft rubber having good elasticity, so that the airbag 400 is significantly elastically deformed under stress. In the preferred embodiment, the airbag 400 is bell-shaped; a bottom of the airbag 400 has a circular airbag opening 410; a remaining portion of the airbag 400 is arranged as closed except for the airbag opening 410; a cylindrical airbag bump 420 is arranged at a top of the airbag 400, for connecting to the sliding member 500; through the sliding member 500, a pressure is exerted on the airbag 400 from the top (free end) to the bottom (fixed end), so that the airbag 400 is compressed and deformed and gas is ejected from the airbag opening 410. FIG. 6 is a structural sketch view of the pressurization device when the airbag is compressed to a lowest position.

Furthermore, in order to realize tight connection between the airbag 400 and the inner cover 200, one side of the channel portion 220 of the inner cover 200, facing the airbag 400, is a first plane 223, for facilitating installing and positioning of the airbag 400; a protruding tubular connection part 224 is vertically formed on the first plane 223, and an opening of the connection part 224 is the second air vent 222; an outer circumferential surface of the connection part 224 is inward concave to form a second clamping groove 225. An annular protruding part 430 is formed at a bottom edge of an inner circumferential surface of the airbag 400; when the airbag 400 is mounted on the tubular connection part 224, the protruding part 430 tightly fits the second clamping groove 225; the protruding part 430 not only prevents the airbag 400 from departing from the connection part 224, making installation of the airbag 400 more stable, but also improves a sealing effect between the airbag 400 and the channel portion 220. It is preferably embodied that: in a sectional view obtained through cutting the airbag 400 by a plane where an axis of the airbag 400 is located, the protruding part 430 is semi-circular.

Figure 9:
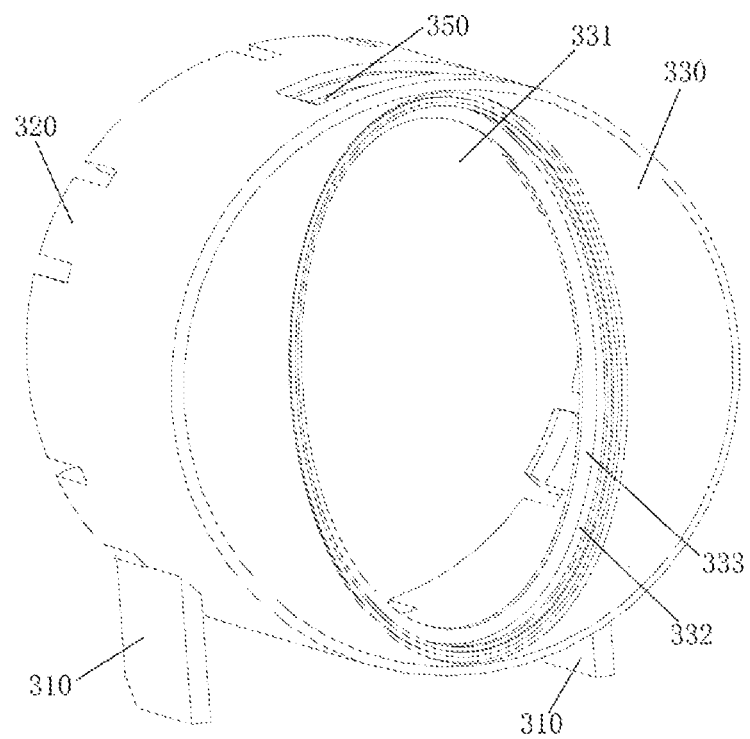
FIG. 9 is a structural sketch view of the outer cover of the pressurization device in FIG. 1 without an outer cover cap.
Figure 10:
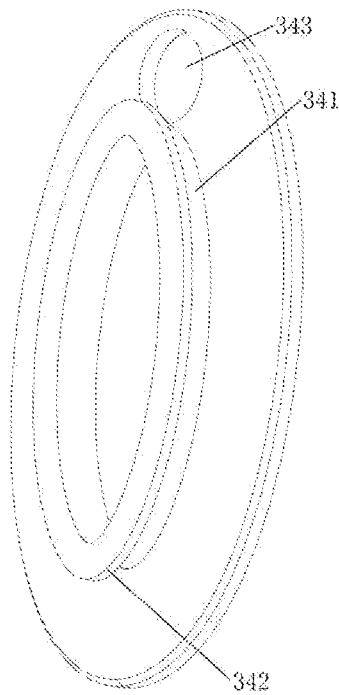
FIG. 10 is a structural sketch view of the outer cover cap of the pressurization device in FIG. 1.

Referring to FIG. 9 and FIG. 10, the outer cover 300 is cylindrical; fixing ribs 310, which extend along an axial direction of the outer cover 300, are arranged on an outer circumferential surface of the outer cover 300; particularly, two fixing ribs 310 are arranged in parallel; the fixing ribs 310 are for fixing the outer cover 300 inside the printing device. A plurality of clamping pieces 320, which are uniformly distributed around an axis of the outer cover 300, are arranged at a front edge of the outer cover 300; the clamping pieces 320 are able to fit the first clamping groove 212 under an external force, so that the inner cover 200 and the outer cover 300 are relatively fixed in the axial direction; when the inner cover 200 rotates with the toner cartridge 100, the inner cover 200 rotates relative to the outer cover 300.

An outer cover end face 330 is arranged at a back end of the outer cover 300; an elliptical end face opening 331 is provided on the outer cover end face 330; an elliptical outer annular part 332 is formed at an edge of the end face opening 331; an elliptical outer cover cap 340 is ultrasonically welded at the end face opening 331, so that the outer cover cap 340 is integrated with the outer cover 300. An elliptical inner annular part 341 is arranged at a front side of the outer cover cap 340; a circumference of the inner annular part 341 is smaller than that of the outer annular part 332, so that an elliptical annular groove is formed between the outer annular part 332 and the inner annular part 341; the elliptical annular groove faces the slide portion 230 of the inner cover 200. When the inner cover 200 except the cap portion 210 is arranged inside the outer cover 300, an outmost end of the sliding slot 231 corresponds to a vertex of a major axis of the elliptical annular groove.

Figure 11:
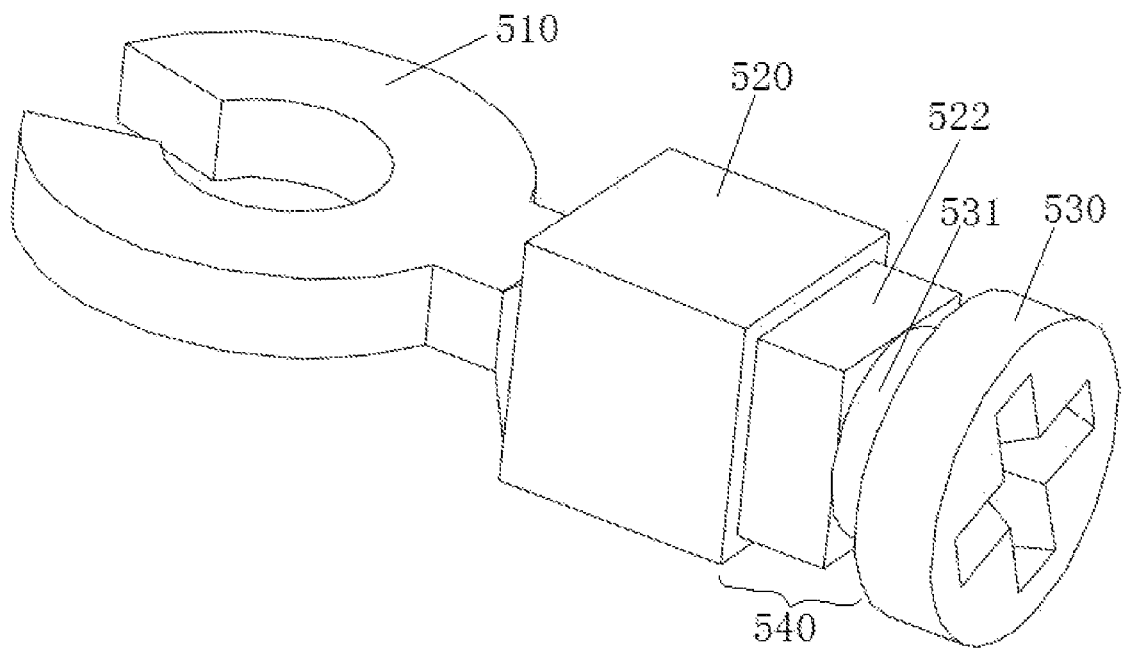
FIG. 11 is a structural sketch view of a sliding member of the pressurization device in FIG. 1.

Referring to FIG. 11, the sliding member 500 comprises an annular portion 510 and a rod portion 520; the annular portion 510 is connected and fixed to the airbag bump 420 at the top of the airbag 400 through interference fitting, for pressing the free end of the airbag 400. The rod portion 520 is connected to a radial side of the annular portion 510 and extends backward.

Therefore, when the sliding member 500 is inserted into the sliding slot 231 and rotates with the inner cover 200 relative to the outer cover 300, because the sliding member 500 also needs to freely slide in the elliptical annular groove of the outer cover 300, the sliding member 500 continuously moves back and forth in the sliding slot 231 during rotation of the toner cartridge 100. In addition, when the sliding member 500 slides from the vertex of the major axis (an endpoint of the major axis) to a co-vertex of a minor axis (an endpoint of the minor axis) in the elliptical annular groove, the sliding member 500 moves inward from the outmost end in the sliding slot 231, and meanwhile the annular portion 510 presses the airbag 400, so that gas inside the airbag 400 is ejected into the toner cartridge 100 through the channel portion 220; when the sliding member 500 slides from the co-vertex of the minor axis to the other vertex of the major axis in the elliptical annular groove, the sliding member 500 moves toward the outmost end in the sliding slot 231, and the airbag 400 recovers (when the airbag recovers, because the front end of the toner cartridge has good air permeability, toner inside the toner cartridge will not be sucked back); therefore, when the sliding member 500 presses the airbag 400 again, the airbag 400 will eject gas again owing to deformation, so that airflow is continuously ejected into the toner cartridge 100. Furthermore, under blowing of the airflow, toner inside the toner cartridge mixes with gas and is ejected out together from a toner outlet at the front end of the toner cartridge, so that an output amount of the toner is increased, fluidity of the ejected toner is improved, problems such as easy compaction and clumping of the toner at the toner outlet and inside each toner flowing passage of the printing device are solved, fluidity of the toner inside each flowing passage is improved, and a blockage due to accumulation is effectively prevented; moreover, while improving the fluidity of the toner, a transportation speed and transportation efficiency of the toner to the toner output device are also improved; under the situation of same rotation turns of the toner cartridge of the printing device, more toner is transported; that is to say, when transporting the same amount of toner, the rotation turns of the toner cartridge can be decreased, so as to reduce the energy consumption.

Furthermore, in order to make the sliding member 500 more stably press the airbag 400, the top of the airbag 400 is a second plane 440; the second plane 440 is parallel with the first plane 223 of the inner cover 200, so that the annular portion 510 of the sliding member 500 better bonds to the second plane 440, and the airbag 400 is ensured to be repeatedly pressed always along the axial direction thereof, making the ejected airflow constant.

Figure 5:
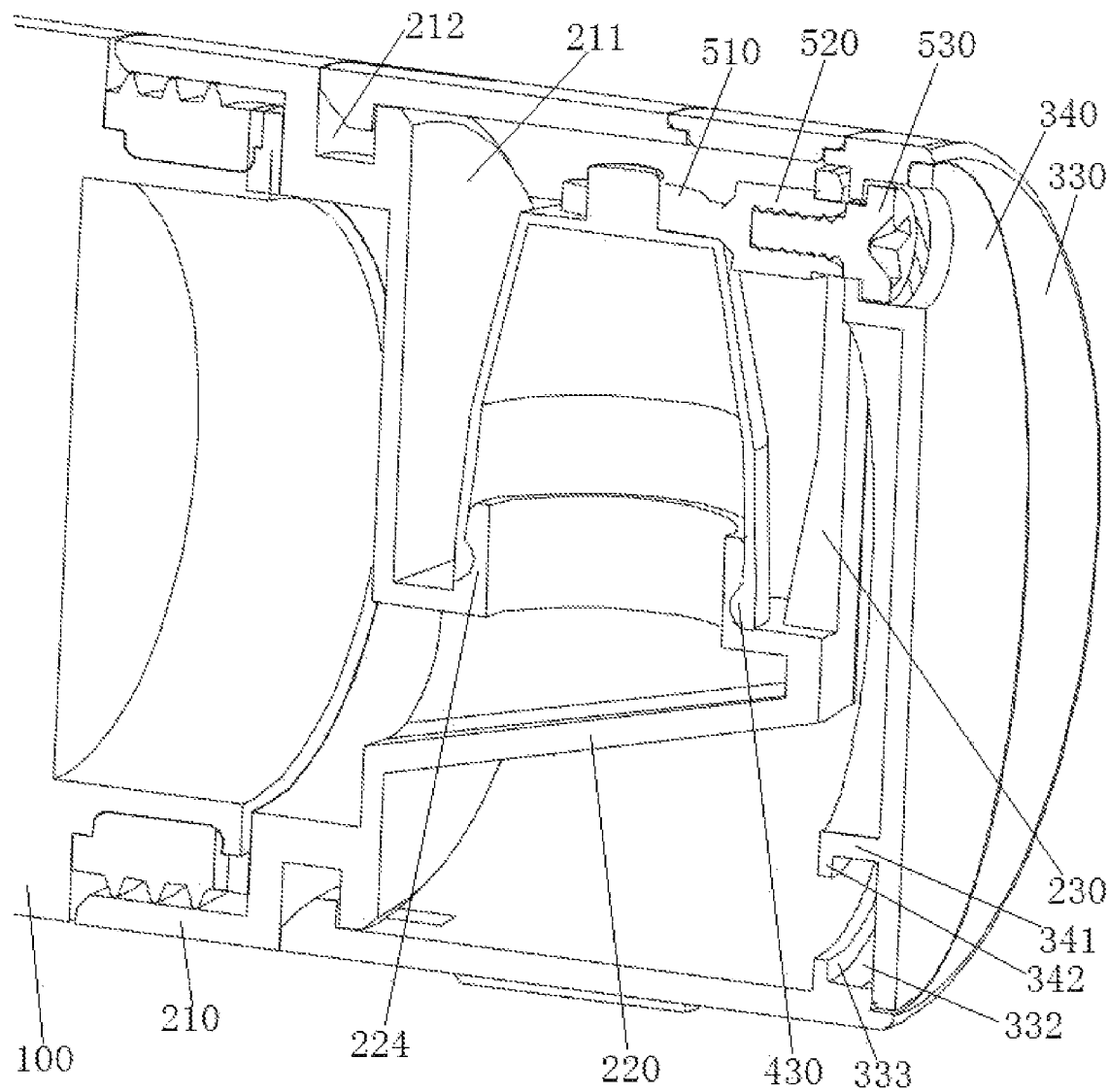
FIG. 5 is a sectional view of the pressurization device in FIG. 1.

Referring to FIG. 5 and FIG. 11, a threaded hole 521 is provided at a back end face of the rod portion 520, for fixing a screw 530; a square platform 522 is arranged at a back end of the rod portion 520; two sides of the square platform 522 are parallel with inner sides of the sliding slot 231, so that the square platform is exactly inserted into the sliding slot 231 for limiting, guaranteeing that the airbag 400 can be repeatedly pressed along the radial direction thereof. Meanwhile, a first limiting convex edge 333 is formed on the outer annular part 332 of the outer cover 300 and protrudes inward along the radial direction; a second limiting convex edge 342 is formed on the inner annular part 341 of the outer cover cap 340 and protrudes outward along the radial direction; a circular platform 531 is between a head and a threaded portion of the screw 530; the circular platform 531 is exactly limited between the first limiting convex edge 333 and the second limiting convex edge 342; therefore, the head of the screw 530 is located between the outer annular part 332 and the inner annular part 341, the square platform 522 and the circular platform 531 together from a fitting member 540, and the fitting member 540 is limited among the first limiting convex edge 333, the second limiting convex edge 342 and the slide portion 230, so that the sliding member 500 is axially fixed.

In order to facilitate installation of the sliding member 500 and the screw 530, an outer cover opening 350 is provided on the outer circumferential surface of the outer cover 300, and a screw mounting hole 343 is provided at a bottom of the elliptical annular groove and located at the vertex of the major axis of the elliptical annular groove; during installation, a front end of the sliding member 500 is firstly positioned with a tool such as a clamp through the outer cover opening 350, then the screw 530 passes through the screw mounting hole 343 from back to front and is mounted to a back end of the sliding member 500, which is easy to operation; after installation, the outer cover opening 350 is sealed by a sealing cap 360. Moreover, in order to ensure sealing between the inner cover 200 and the toner cartridge 100, a sealing ring 250 is arranged inside the cap portion 210 and at a joint with an outer cover end face of the toner cartridge 100.

The present invention further provides a toner cartridge, comprising the pressurization device. The specific structure of the pressurization device is described above. Because the toner cartridge adopts all of the technical solutions in the above preferred embodiment, the toner cartridge has all of the beneficial effects brought by the technical solutions of the above preferred embodiment and is not repeated herein.

The above-mentioned is only the preferred embodiment of the present invention, not for limiting the protection scope of the present invention. Within the inventive concept of the present invention, the equivalent structural transformations based on the specification and accompanying drawings of the present invention and the direct/indirect applications in other related technical fields are all encompassed in the protection scope of the present invention.

What is claimed is:

1. A pressurization device for a toner cartridge, comprising:
    an inner cover, which is arranged at a toner feeding port of the toner cartridge;
    an airbag, which is made of elastic material, wherein the airbag comprises a fixed end that is fixed to the inner cover and a free end; the fixed end is provided with an airbag opening interconnected to an interior of the toner cartridge; and a remaining portion of the airbag is arranged as closed except for the airbag opening;
    a sliding member with a first end connected to the free end of the airbag, wherein the first end of the sliding member is able to move toward the fixed end of the airbag back and forth, so that the airbag ejects gas into the toner cartridge by means of being compressed; and
    an outer cover, wherein: an elliptical annular groove facing the toner cartridge is formed on the outer cover;
    wherein: a slide portion is arranged at a side of the inner cover, closing to the elliptical annular groove; a sliding slot is provided on the slide portion;
    a middle part of the sliding member is able to slide in the sliding slot; a second end of the sliding member is slidably embedded in the elliptical annular groove;
    when the slide portion rotates with the toner cartridge relative to the outer cover, the sliding member slides back and forth in the sliding slot.

2. The pressurization device, as recited in claim 1, wherein: a sealing ring is arranged between the inner cover and the toner cartridge.

3. A toner cartridge, comprising the pressurization device as recited in claim 1.

4. The pressurization device, as recited in claim 1, wherein the inner cover comprises:
    a cap portion, which is arranged on the toner cartridge; and
    a channel portion, which protrudes from a side, away from the toner cartridge, of the cap portion, wherein: the channel portion has a first air vent formed at a joint with the cap portion, and a second air vent; the fixed end of the airbag is fixed on the channel portion, the airbag opening corresponds to the second air vent, and the second air vent is sealed by the airbag.

5. The pressurization device, as recited in claim 4, wherein: the cap portion is connected with the toner cartridge in threaded connection; a reversion-preventing bump is arranged at a tail end of a thread on the toner cartridge, and a reversion-preventing opening is provided on the cap portion; when the cap portion is completely connected with the toner cartridge, the reversion-preventing opening exactly matches with the reversion-preventing bump.

6. The pressurization device, as recited in claim 4, wherein: the slide portion and the channel portion form an L-shaped structure.

7. The pressurization device, as recited in claim 4, wherein: the sliding member comprises an annular portion and a rod portion; a cylindrical airbag bump is arranged at the free end of the airbag; the annular portion tightly clamps the airbag bump; and the rod portion is connected to a radial side of the annular portion.

8. The pressurization device, as recited in claim 4, wherein: a tubular connection part is formed on the channel portion; an opening of the connection part is the second air vent; the airbag is bell-shaped, and a bottom opening of the airbag is the airbag opening; the airbag tightly clamps the connection part.

9. The pressurization device, as recited in claim 8, wherein: an outer circumferential surface of the connection part is inward concave to form an annular second clamping groove; a bottom edge of an inner circumferential surface of the airbag protrudes inward to form an annular protruding part; the protruding part tightly fits the second clamping groove.

10. The pressurization device, as recited in claim 1, wherein: the outer cover is cylindrical; a plurality of clamping pieces are arranged at a first end of the outer cover, closing to the toner cartridge; an outer circumferential surface of the inner cover is inward concave to form an annular first clamping groove; when the inner cover except the cap portion is arranged inside the outer cover, the clamping pieces rotationally fits the first clamping groove.

11. The pressurization device, as recited in claim 10, wherein: fixing ribs are arranged on an outer circumferential surface of the outer cover, for fixing the outer cover.

12. The pressurization device, as recited in claim 10, wherein: an outer cover end face is formed at a second end of the outer cover, away from the toner cartridge; an end face opening is provided on the outer cover end face; an outer cover cap is arranged at the end face opening; the outer cover cap is integrated with the outer cover end face through ultrasonic welding; a protruding inner annular part is formed on the outer cover cap; an outer annular part, opposite to the inner annular part, is formed at an edge of the end face opening; the inner annular part and the outer annular part are both elliptical; and the elliptical annular groove is formed between the inner annular part and the outer annular part.

13. The pressurization device, as recited in claim 12, wherein: a first limiting convex edge, which protrudes inward, is arranged on the outer annular part; a second limiting convex edge is arranged on the inner annular part; the first limiting convex edge corresponds to the second limiting convex edge, for positioning the second end of the sliding member.

14. The pressurization device, as recited in claim 13, wherein: a threaded hole is provided at the second end of the sliding member; a screw is mounted in the threaded hole; a square platform is arranged at a side of the sliding member, where the second end is located; the square platform matches with inner sides of the sliding slot;

a circular platform is between a head and a threaded portion of the screw; the circular platform is limited between the first limiting convex edge and the second limiting convex edge.

15. The pressurization device, as recited in claim 14, wherein: a screw mounting hole is provided at a bottom of the elliptical annular groove.

16. The pressurization device, as recited in claim 15, wherein: an outer cover opening is provided on an outer circumferential surface of the outer cover and is close to the screw mounting hole.

\* \* \* \* \*